United States Patent
Pettersson et al.

[11] Patent Number: 5,749,331
[45] Date of Patent: May 12, 1998

[54] POWDERED METAL CYLINDER LINERS

[75] Inventors: Bjorn Ola Alfons Pettersson, Huntsville; Alex Plavnik, Owens Cross Roads, both of Ala.; Eric Boreczky, Royal Oak, Mich.

[73] Assignee: Tecsyn, Inc., Canada

[21] Appl. No.: 516,976

[22] Filed: Aug. 18, 1995

Related U.S. Application Data

[60] Continuation-in-part of Ser. No. 299,441, Sep. 1, 1994, Pat. No. 5,466,414, which is a division of Ser. No. 855,881, Mar. 23, 1992, Pat. No. 5,346,529.

[51] Int. Cl.⁶ ............................................. B22F 7/06
[52] U.S. Cl. ............................................ 123/193.2
[58] Field of Search .......................... 123/193.1, 193.2; 29/888.06, 888.061; 75/252; 419/11

[56] References Cited

U.S. PATENT DOCUMENTS

| | | |
|---|---|---|
| 1,010,787 | 12/1911 | Nilson . |
| 2,696,434 | 12/1954 | Bartlett . |
| 3,781,022 | 12/1973 | Kumabe et al. . |
| 3,808,955 | 5/1974 | Hamada et al. ............ 92/169 |
| 3,903,951 | 9/1975 | Kaneko et al. . |
| 4,021,205 | 5/1977 | Matsuda et al. . |
| 4,039,703 | 8/1977 | Kamijo et al. . |
| 4,467,772 | 8/1984 | Williamson ............ 123/506 |
| 4,496,299 | 1/1985 | Pettersson . |
| 4,508,158 | 4/1985 | Amateau et al. . |
| 4,546,048 | 10/1985 | Guenther . |
| 4,563,143 | 1/1986 | Pettersson . |
| 4,564,352 | 1/1986 | Pettersson . |
| 4,604,252 | 8/1986 | Stigler . |
| 4,650,644 | 3/1987 | Huret et al. ............ 123/193.2 |
| 4,750,667 | 6/1988 | Takahashi et al. . |
| 4,870,733 | 10/1989 | Kawabata . |
| 4,880,598 | 11/1989 | Kaad et al. . |
| 4,926,801 | 5/1990 | Eisenberg et al. ............ 123/193.2 |
| 4,959,276 | 9/1990 | Hagiwara et al. . |
| 4,986,231 | 1/1991 | Brown . |
| 5,148,780 | 9/1992 | Urano et al. ............ 123/193.2 |
| 5,176,113 | 1/1993 | Hama et al. ............ 123/41.79 |
| 5,189,992 | 3/1993 | Hama et al. ............ 123/41.84 |
| 5,199,390 | 4/1993 | Hama et al. ............ 123/41.84 |
| 5,280,819 | 1/1994 | Newkirk et al. . |
| 5,291,862 | 3/1994 | Katoh et al. ............ 123/193.2 |
| 5,315,970 | 5/1994 | Rao et al. ............ 123/193.2 |
| 5,341,866 | 8/1994 | Munro . |
| 5,357,921 | 10/1994 | Katoh et al. ............ 123/193.2 |

FOREIGN PATENT DOCUMENTS 1224617  7/1987  Canada .

OTHER PUBLICATIONS

SAE Technical Paper Series, "Isostatic Drybag Compacted Powder Metallurgical Cylinder Liner, Applications & Properties", Ola Pettersson Detroit, MI, Feb. 24–28, 1992.

*Primary Examiner*—Marguerite McMahon
*Attorney, Agent, or Firm*—Young & Basile, P.C.

[57] ABSTRACT

A cylinder liner for use in an internal combustion engine having a cylinder block with a cylinder bore adapted to carry a piston therein. The liner comprises a body formed from a powdered metal material, the body formed therefrom being rigid and wear resistant. The body comprises a smooth, inner, piston-directing surface; an outer, cylinder bore-contacting surface; and an upper, combustion containing area. A mechanism is provided for improving transfer of heat from the combustion containing area to the cylinder block. A mechanism, disposed within the piston-directing surface, is provided for improving piston scuff resistance while maintaining piston-directing surface smoothness.

28 Claims, 3 Drawing Sheets

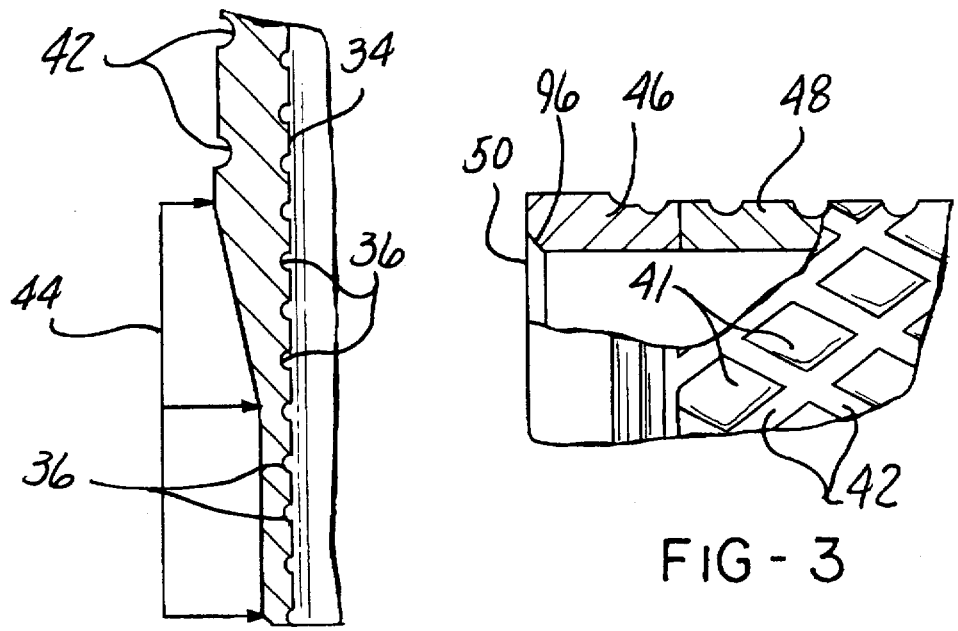
FIG-2A
FIG-3
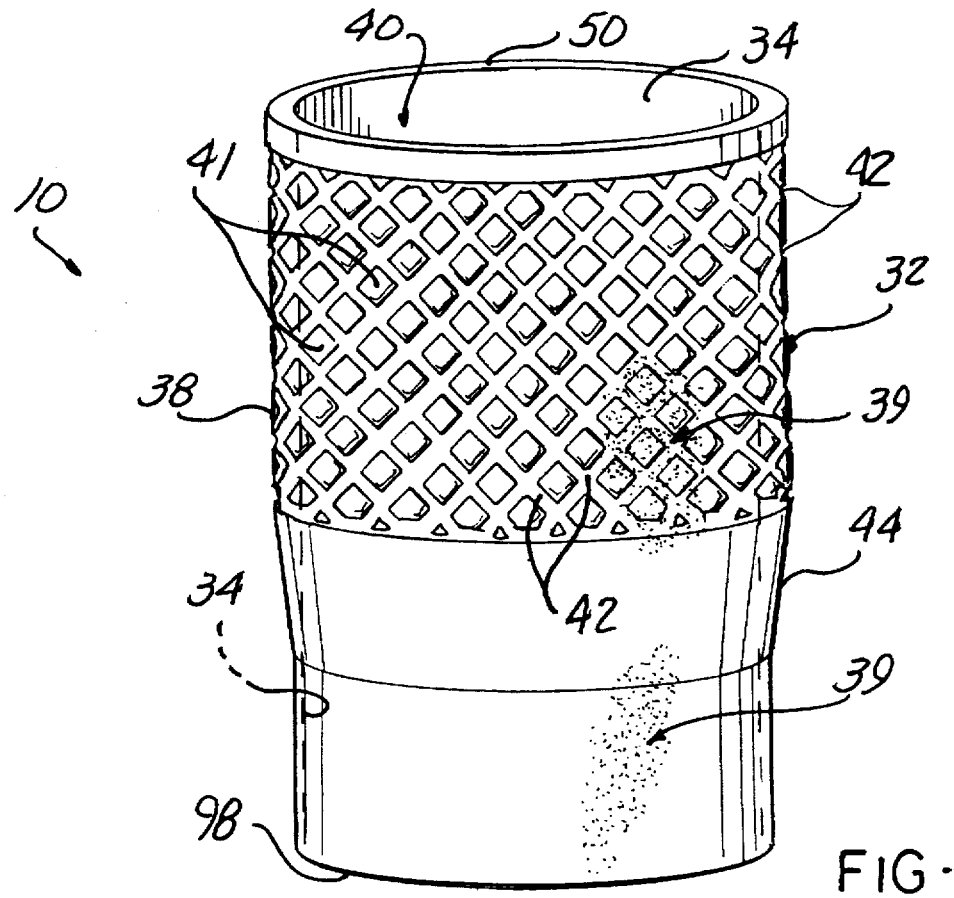
FIG-2

FIG - 4

| | Example 1 | Example 2 | Example 3: Cu Infiltrated | Cast Iron |
|---|---|---|---|---|
| Chemical Analysis: | | | | |
| Carbon | 0.85% | 0.85% | 0.85% | 3.0% |
| Phosphorous | 0.45% | <0.015% | 0.45% | <0.2% |
| Copper | <0.25% | 1.50% | Varies: Fills Pores | <0.50% |
| Manganese Sulfide | 0.50% | 0.50% | 0.50% | N/A |
| Iron | Balance | Balance | Balance | Balance |
| Structure | Perlite | Perlite | Perlite | Flake Graphite |
| | Porosity: Oil Retaining | Porosity: Oil Retaining | Porosity: Oil Retaining | Porosity: Not Applicable |
| Material Properties: | Example 1 | Example 2 | Example 3: Cu Infiltrated | Cast Iron |
| Density: Body | 6.7-6.9 g/cc | 6.7-6.9 g/cc | 6.7-6.9 g/cc | 7.3 g/cc |
| Cu Inf. Area | N/A | N/A | 7.2-7.4 g/cc | Not Capable |
| Hardness | 75-90 HRb (Apparent) | 75-90 HRb (Apparent) | 75-90 HRb (Apparent) | 85-95 HRb |
| Tensile Strength | >60 Ksi (>410 Mpa) | >60 Ksi (>410 Mpa) | >60 Ksi (>410 Mpa) | 40 Ksi (300 Mpa) |
| Modulus of Elasticity | >17 MSI (>120,000 Mpa) | >17 MSI (>120,000 Mpa) | >17 MSI (>120,000 Mpa) | 14 MSI (100,000 Mpa) |
| Elongation | <2.0% | <2.0% | <2.0% | <1.0% |
| Conductivity: Body | 23-28 w/mk | 24-28 w/mk | 23-28 w/mk | 26-30 w/mk |
| Cu Inf. Area | N/A | N/A | 30-35 w/mk | Not Capable |

POWDERED METAL CYLINDER LINERS

CROSS-REFERENCE TO CO-PENDING APPLICATIONS

This application is a continuation-in-part of Ser. No. 08/299,441, filed Sep. 1, 1994, now U.S. Pat. No. 5,466,414 which is itself a division of Ser. No. 07/855,881, filed Mar. 23, 1992, now U.S. Pat. No. 5,346,529, issued Sep. 13, 1994.

BACKGROUND OF THE INVENTION

The present invention relates to lighter weight cylinder blocks for internal combustion engines, and more particularly to powdered metal cylinder liners for use within the cylinder blocks.

For years, motor vehicle manufacturers have sought more efficient, cost effective and viable ways to reduce weight in motor vehicles, particularly automobiles, without sacrificing performance and/or safety. Obviously, one of the largest and most important components of the automobile is the engine, of which the cylinder block forms a substantial part. In the past, cylinder blocks had been formed from cast iron, which provided strength, durability and long service life. However, as can be appreciated, cast iron is quite heavy, and even, for today's automobiles, may be excessively so. Further, it does not have a good thermal conductivity. As such, the industry sought alternatives to cast iron cylinder blocks.

One such alternative is to form the blocks from aluminum. Aluminum is very lightweight and has good thermal conductivity, each of which are desirable features in the automobile industry. However, aluminum is very soft and easily scratched and thus does not provide the strength, durability and long service life required for use in a cylinder block.

As an alternative, automobile manufacturers developed the use of more wear resistant cylinder liners within the cylinder bores in the aluminum block. One such liner is made from cast iron. However, this yet is too heavy a material, even for use as a liner, and still does not have as high a thermal conductivity as may be desired. Aluminum alloy cylinders were then developed which had relatively good thermal conductivity, but were still liable to wear. High silicon aluminum alloy cylinders were then developed, which improved the wear resistance. However, these liners had a poor machinability due to the hardness of the silicon, and required an excessive amount of time and labor to treat the inner surface thereof. This resulted in an unacceptably high cost to manufacture. It would be desirable to develop a cylinder liner which overcomes these drawbacks.

Thus, it is an object of the present invention to provide a powdered metal cylinder liner which is lightweight yet wear resistant, thereby advantageously preserving fuel efficiency or allowing automobile designers to include more value-added features. It is a further object of the present invention to provide such a liner which has better bonding properties in aluminum and other metallic block engine applications as compared with cast iron liners. It is a further object of the present invention to provide such a liner which has a low cylinder surface roughness to advantageously improve emissions, and reduce oil consumption and blowby, and/or to increase efficiency in high performance engines.

It is yet a further object of the present invention to provide a liner having lower friction and wear characteristics of the power cylinder system. Still further, it is an object of the present invention to provide such a liner which may provide noise attenuation characteristics. Yet still further, it is an object of the present invention to provide such a liner which provides piston and piston ring scuff resistance. It is a further object of the present invention to provide such a liner which may advantageously have a higher thermal conductivity if desired.

SUMMARY OF THE INVENTION

The present invention, in achieving the objects recited hereinabove, addresses and solves the problems enumerated above. The present invention comprises a cylinder liner for use in an internal combustion engine having a cylinder block with a cylinder bore adapted to carry a piston therein. The liner comprises a body formed from a powdered metal material, the body formed therefrom being rigid and wear resistant, with the body comprising a smooth, inner, piston-directing surface; an outer, cylinder bore-contacting surface; and an upper, combustion containing area. The liner further comprises means for improving transfer of heat from the combustion containing area to the cylinder block. Means, disposed within the piston-directing surface, are provided for improving piston ring and piston scuff resistance while maintaining piston-directing surface smoothness.

BRIEF DESCRIPTION OF THE DRAWINGS

Other objects, features and advantages of the present invention will become apparent by reference to the following detailed description and drawings, in which:

FIG. 2 is an enlarged perspective view of a cylinder liner according to the present invention;

FIG. 2A is a further enlarged, cutaway cross sectional view of the liner of FIG. 2, showing the tapered area;

FIG. 3 is an enlarged, cutaway cross sectional view of a cylinder liner with copper infiltration;

FIG. 4 is a table showing three Examples of suitable powdered metal materials for use in the present invention and typical material properties thereof, in comparison to a cast iron material.

DETAILED DESCRIPTION OF THE PREFERRED EMBODIMENTS

Figure 1:
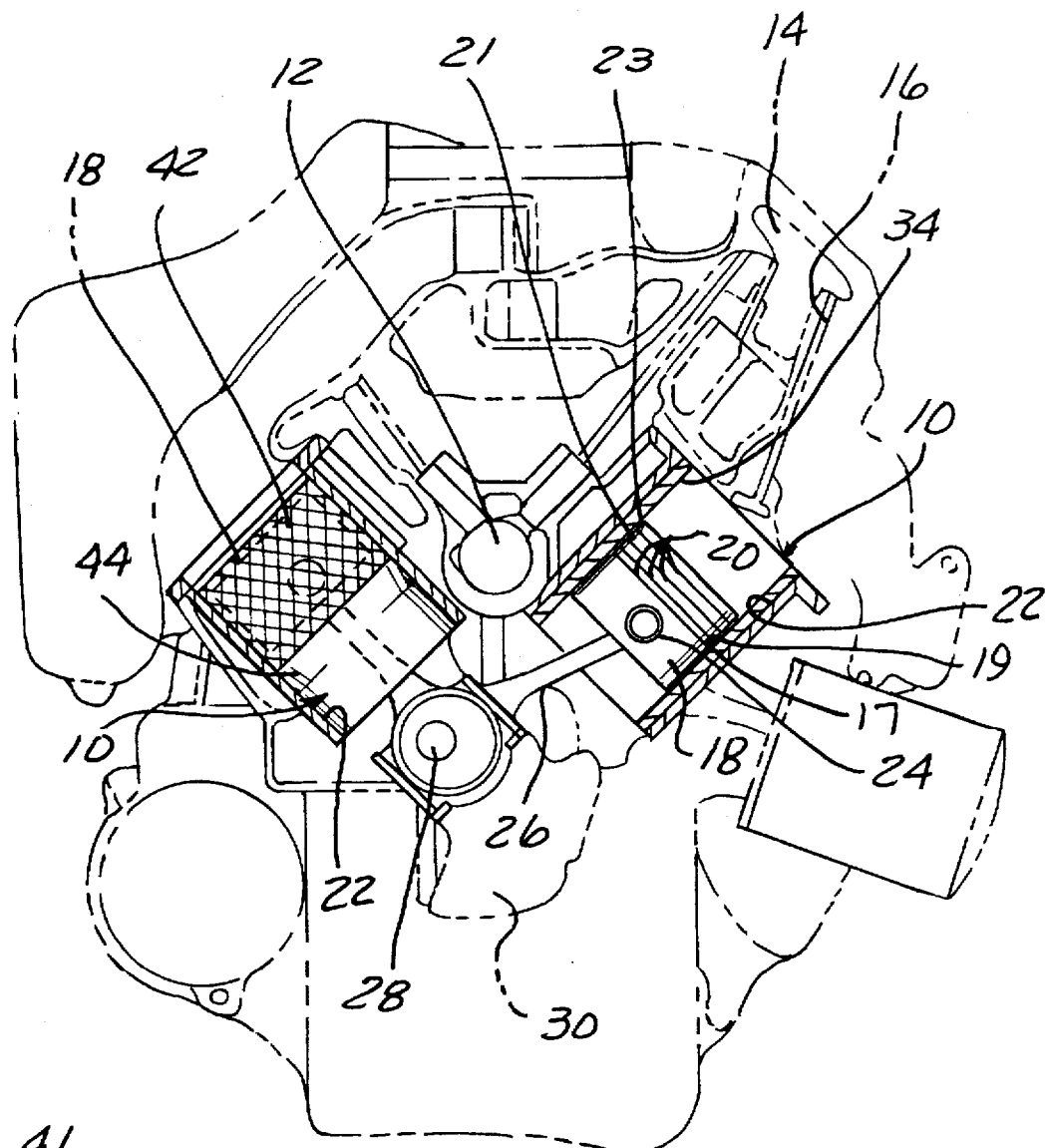
FIG. 1 is a partially cross sectioned, cutaway view showing two cylinder liners according to the present invention in place in a typical cylinder block.

Referring now to FIG. 1, the cylinder liner of the present invention is designated generally as 10. Two cylinder liners 10 are shown in a typical engine block having the following conventional features: camshaft 12; rocker arm 14; valve 16; piston 18 with compression and oil rings 20; cylinder bores 22; piston pin 24; connecting rod 26; and crankshaft 28 with counterweight 30.

Referring now to FIG. 2, cylinder liner 10 comprises a body 32 formed from a powdered metal material. The material should render a body which is rigid and wear resistant so as to provide long service life, thereby substantially preventing general wear which could lead to blowby of hot gases; and to prevent undesirable scoring which could lead to oil burn and environmentally harmful emissions. It is to be understood that any powdered metal material having these wear characteristics, as well as the ability to sufficiently transfer heat from the combustion area to the cylinder block, may be used in accord with the present invention.

As examples, in the preferred embodiment, the powdered metal material consists essentially of between about 0.8% and about 1.3% by weight carbon; between about 0.1% and about 0.6% by weight phosphorous; between about 0% and about 5% by weight solid lubricant selected from the group consisting of manganese sulfide, graphite, molybdenum disulfide, selenium, bismuth, tellurium, and mixtures thereof; and the balance being iron. As a further example, the powdered metal material may consist essentially of between about 0.8% and about 1.3% by weight carbon; between about 1% and about 4% by weight copper; between about 0% and about 5% by weight solid lubricant selected from the group consisting of manganese sulfide, graphite, molybdenum disulfide, selenium, bismuth, tellurium, and mixtures thereof; and the balance being iron. As yet a further example, the powdered metal material may consist essentially of between about 0.8% and about 1.3% by weight carbon; between about 0% and about 4% by weight copper; between about 0% and about 5% by weight solid lubricant selected from the group consisting of manganese sulfide, graphite, molybdenum disulfide, selenium, bismuth, tellurium, and mixtures thereof; the balance by weight iron having an average particle size of substantially 100 mesh with an oxide content less than about 0.3% by weight; and between about 5% and about 50% by weight powdered tool steel alloy selected from those commercially available powders designated by the American Steel and Iron Institute as M2, M3 and T15. In a further example, the powdered metal material may consist essentially of between about 0.8% and about 1.3% by weight carbon; between about 0.1% and about 0.6% by weight phosphorous; between about 1% and about 4% by weight copper; between about 0% and about 5% by weight solid lubricant selected from the group consisting of manganese sulfide, graphite, molybdenum disulfide, selenium, bismuth, tellurium, and mixtures thereof; and the balance being iron.

As more specific examples, in the preferred embodiment, the powdered metal material consists essentially of between about 0.9% and about 1.3% by weight carbon; between about 0.8% and about 3.0% by weight copper; between about 0.01% and about 5.0% by weight solid lubricant selected from the group consisting of manganese sulfide, graphite, molybdenum disulfide, selenium, bismuth, tellurium, and mixtures thereof; up to about 98.3% by weight iron having an average particle size of substantially 100 mesh with an oxide content less than about 0.3% by weight; and between about 0.01% and about 50% by weight powdered tool steel alloy selected from those commercially available powders designated by the American Steel and Iron Institute as M2, M3 and T15. In a further example, the powdered metal material may consist essentially of about 0.85% by weight carbon; about 0.45% by weight phosphorous; about 0.50% by weight by weight solid lubricant selected from the group consisting of manganese sulfide, graphite, molybdenum disulfide, selenium, bismuth, tellurium, and mixtures thereof; and about 98% by weight iron. As yet a further example, the powdered metal material may consist essentially of about 0.85% by weight carbon; about 1.50% by weight copper; about 0.50% by weight by weight solid lubricant selected from the group consisting of manganese sulfide, graphite, molybdenum disulfide, selenium, bismuth, tellurium, and mixtures thereof; and about 97% by weight iron.

The body 32 comprises a smooth, inner, piston-directing surface 34. This surface 34 has disposed within it means for improving piston ring 20 and piston 18 scuff resistance while maintaining piston-directing surface 34 smoothness. Piston ring 20/piston 18 scuffing may lead to undesirable, increased friction. It is to be understood that the scuff resistance improving means may comprise any suitable means, however, in the preferred embodiment, this means comprises a plurality of pores 36 distributed throughout the piston-directing surface 34. As best seen in FIG. 2A, the pores 36 have a size sufficient to hold an amount of lubricant to form a substantially continuous, smooth glide path between the piston ring 20 and the inner, piston-directing surface 34. In the case of any carbon build-up on piston lands 17, 19, 21 and 23, which build-up may eventually be particularly possible on top land 23, the lubricant also forms a substantially continuous, smooth glide path between the piston 18 and the inner, piston-directing surface 34. The size of pores 36 has been highly exaggerated in FIG. 2A, for illustrative purposes only. The lubricant held within pores 36 is typically oil; and, if too much oil were trapped between the piston ring 20 and the surface 34, it would burn, leading to higher oil consumption and environmentally harmful emissions. Thus, the amount of oil held within pores 36 is an amount sufficient to provide the glide path without oil burn.

Body 32 further comprises an outer, cylinder bore-contacting surface 38, and an upper, combustion containing area 40. The cylinder liner 10 further comprises means for improving transfer of heat from the combustion containing area 40 to the cylinder block. It is to be understood that this heat transfer improving means may comprise any suitable means. However, in the preferred embodiment, as best seen in FIG. 2, this means comprises an isostatically formed, rough surface finish 39 extending about the outer, cylinder bore-contacting surface 38. Exemplary portions of surface finish 39 are shown; however, it is to be understood that it extends about the entire outer surface 38. The surface finish 39 has micropores (not shown) dispersed therein, wherein the rough surface finish 39 and micropores may promote a substantially complete metal-to-metal bond between the body 32 and the cylinder bore 22. The metal-to-metal bond may promote more efficient heat transfer. Surface finish 39 results from the isostatic process as described in the above-named parent application, Ser. No. 08/299,441. Surface finish 39 may also provide a mechanical, interlocking bond between the roughness of the surface 39 and the cylinder bore 22.

Without being bound to any theory, it is believed that, during casting, molten metal, for example aluminum, is forced into the micropores as a result of the pressure in the mold. It is further believed that the surface finish 39 partially alloys with the molten aluminum during casting. It is believed that, as a result of these features, yet additional desirable bond strength and heat transfer are achieved.

Figure 5:
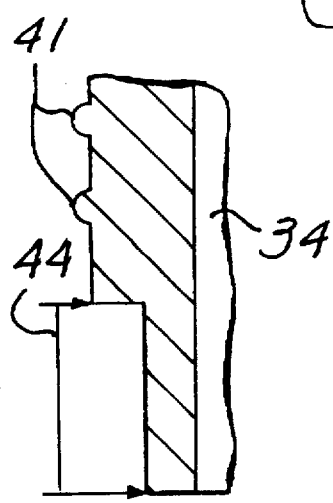
FIG. 5 is an enlarged, cutaway cross sectional view of an alternate embodiment of the liner of the present invention, showing raised ribs and a step-type taper.

The heat transfer improving means may further comprise a plurality of regularly spaced raised projections 41 having grooves 42 therebetween, the projections 41 extending around the outer surface 38 in an area substantially corresponding to the combustion containing area 40. The projections 41 and grooves 42 provide increased surface area for an interlocking bond between the body 32 and the cylinder bore 22. This greater bond strength aids in assuring transfer of heat from the combustion area 40 to the cylinder block. Projections 41 and grooves 42 may be in any suitable shape and spacing, including any suitable geometric pattern as desired; this may include a single or a plurality of raised ribs, projections, and the like. However, as shown in FIG. 2, in the preferred embodiment, a criss cross diamond-shaped pattern is used. An alternate embodiment is shown in FIG. 5, which depicts raised projections 41 without any grooves therebetween. These raised projections 41 may also fortuitously add to the rigidity of the cylinder liner 10.

The raised projections 41 may also aid in heat transfer by promoting a substantially complete metal-to-metal bond between the body 32 and the cylinder bore 22. Without being bound to any theory, it is believed that, as the molten metal, for example aluminum, is injected into the die and comes in contact with the liner 10, the projections 41 break up a microthin layer of aluminum oxide ($Al_2O_3$), which $Al_2O_3$ could interfere with a complete metal-to-metal bond. However, with the oxides broken up, a more substantial metal-to-metal bonding may take place. Die casting has been used as an example herein, however, it is to be understood that different suitable casting methods may be used, which methods may influence the metallic bonding.

As seen in FIG. 2, the outer, cylinder bore-contacting surface 38 may be tapered at an area 44 below the combustion containing area 40. This tapered area 44 may advantageously be part of powdered metal cylinder liner 10 without an excess of finish machining operations, which machining operations would make the taper economically unfeasible for use as an automobile engine cylinder liner. Further, although area 44 is tapered, smooth, inner piston-directing surface 34 remains substantially straight, for desirable piston movement. This somewhat slight taper 44 is especially desirable when the cylinder liners 10 are used in V6 or V8 engines, where the gross reduction in weight from the tapers 44 on the cylinder liners 10 may be as much as 6/10 pound per cylinder. For a V8 engine, this translates into a net (taking into account the aluminum which will fill in the tapered area during casting) weight savings of approximately 3.2 pounds. Since, as is well known in the motor vehicle industry today, weight reduction leads to better fuel economy and lower emissions, this weight savings from the taper 44 may be quite desirable.

Referring now to FIG. 5, a further style of tapered area 44 is shown in an alternate embodiment of the cylinder liner 10 of the present invention. In this Figure, a stepped down type of tapered area 44 is shown. It is to be understood that any type of tapered area 44, from the stepped type to the sloping type shown in FIG. 2A, and any intermediate configuration therebetween, may suitably be used as necessary and/or desired for a particular end use. It is to be further understood that the tapered area 44 may extend the full length (not shown) of the cylinder liner 10.

Referring again to FIG. 1, both cylinder bores 22 shown are sectioned; and cylinder liner 10 shown on the right side of the drawing is also cross sectioned, showing the smooth, inner piston-directing surface 34 along which piston ring 20 and piston 18 glide. On the left side of the Figure, the cylinder liner 10 is not sectioned, but rather shows the upper combustion containing area 40 having the regularly spaced grooves 42 cut therein. Tapered area 44 is also shown, in a somewhat exaggerated manner—for illustrative purposes, the tapered area 44 is shown spaced from the inner wall of the cylinder bore 22; however, it should be noted that there is a bond between the entire outer surface 38 of body 32 and the cylinder bore 22.

In practice, this bonding may be accomplished by any suitable means. However, in the preferred embodiment, the cylinder liners 10 may be cast in metallic, such as aluminum, block engines. In such a case, the liners 10 are appropriately positioned within the aluminum cylinder block die. Molten aluminum is then injected into the die. When the aluminum cools and solidifies, liners 10 are solidly in place, and have thus become part of the aluminum block engine.

It is to be understood that, in addition to aluminum engine blocks, the present invention may be useful in many, various-type metal die cast engine blocks. In addition, the present invention may also be useful as a press-in cylinder liner.

In a further preferred embodiment of the present invention, a portion of the upper, combustion containing area 40 may be infiltrated with copper 46, as best seen in FIG. 3. Non-infiltrated powdered metal material is designated as 48. The copper 46 infiltration may be as far down as desired; the copper 46 further adds increased stiffness and strength in that area of the liner 10 in which it is found. The copper 46 may further add to improved heat transfer from the combustion area 40 to the cylinder block. This copper 46 infiltration may be especially desirable in engines whose cooling systems are not quite as efficient as they should or need to be. In the preferred embodiment, the copper-infiltration substantially begins at approximately the upper end 50 of body 32, and substantially ends between about ¼" and about 1" downward (to the right as shown in FIG. 3) from the upper end 50.

With the copper-infiltrated embodiment, the powdered metal material may consist essentially of any and/or all of the material examples described hereinabove. The copper infiltration may range anywhere from 0% to 100% infiltration. In both this and the previous embodiment, it is to be understood that any suitable copper and/or copper alloy may be used.

The copper infiltration may be performed by any suitable means. However, in the preferred embodiment, the copper is placed in contact with the liner, and they are sintered above the melting point of the copper. Once liquid, the copper, under the action of capillary forces, enters into the pores 36 of the powdered metal material.

The addition of copper infiltration has been known to increase strength of a powdered metal part without greatly affecting dimensional change. However, in the present invention, it was fortuitously discovered that such infiltration may greatly enhance the amount of heat transferred from the combustion containing area 40 within cylinder liner 10 to the cylinder block, as well as increasing the density and enhancing the stiffness and strength in that area of the liner 10 in which it is found.

To further illustrate the composition of powdered metal materials suitable for use in the present invention, in addition to the exemplary material set out hereinabove, Examples 1–3 are given in FIG. 4. It is to be understood that these examples are provided for illustrative purposes and are not to be construed as limiting the scope of the present invention. It is to be understood that any of Examples 1–3, and/or any mixture thereof may be used in either of the embodiments described above, or in any embodiments described below.

It is to be understood that the powdered metal material may be compacted by any suitable method in accord with the present invention. However, in the preferred embodiment, the powdered metal material is compacted in a high speed, cold isostatic press. This process allows the material of the liner to be optimized for wear and machinability and provides homogeneous properties throughout the liner. The process also allows shorter cycle times than conventional powder metal manufacturing processes and, as a result, is very cost effective. Additionally, the use of the high speed cold isostatic press enables cylinder liners to be produced to near final shape and size, minimizing finish machining operations. Suitable isostatic compacting processes, which is radial as opposed to vertical powdered metal compaction, are more fully described in the following patents, which are incorporated herein by reference:

U.S. Pat. Nos. 5,346,529; 4,496,299; 4,563,143; 4,564,352; 4,880,598; and Canadian Patent No. 1,224,617.

Edges may be chamfered as desired and/or necessary, such as at 96 and 98. In the powdered metal material, these chamfers may be formed in the liner 10 without a finish machining operation.

The present invention as described herein achieves the objects and advantages as set forth above. An additional advantage is that the pores in the powdered metal may help vent trapped gases during die casting. These gases build up as a result of coatings, burning residue, oxides from the molten metal used, etc.

In addition to engines, the present invention may be useful for any kind of insert into a metal cast body having wear and/or bearing surfaces, eg. piston type compressors. The present invention may additionally be useful in the oil industry. When drilling wells, a clay slurry, which is quite abrasive, is pumped into the bore to maintain positive pressure therein. The present invention may be used as a liner for the pump in order to protect it from the abrasive slurry.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A cylinder liner for use in an internal combustion engine having a cylinder block with a cylinder bore adapted to carry a piston therein, the liner comprising:
   a body formed from a powdered metal material, the body formed therefrom being rigid and wear resistant, the body comprising:
      a smooth, inner, piston-directing surface;
      an outer, cylinder bore-contacting surface; and
      an upper, combustion containing area;
   means for improving transfer of heat from the combustion containing area to the cylinder block comprising an isostatically formed, rough surface finish extending about the outer, cylinder bore-contacting surface, the surface finish having micropores dispersed therein, wherein the rough surface finish and micropores promote a substantially complete metal-to-metal bond between the body and the cylinder bore; and
   means, disposed within the piston-directing surface, for improving piston ring and piston scuff resistance while maintaining piston-directing surface smoothness.

2. The cylinder liner as defined in claim 1 wherein the rough surface finish further promotes a mechanical, interlocking bond between the body and the cylinder bore.

3. The cylinder liner as defined in claim 1 wherein the heat transfer improving means comprises at least one raised projection extending around the outer surface, wherein the projection provides an interlocking bond between the body and the cylinder bore.

4. The cylinder liner as defined in claim 3 wherein there are a plurality of regularly spaced raised projections extending around the outer surface in an area substantially corresponding to the combustion containing area.

5. The cylinder liner as defined in claim 3 wherein the projections further promote a substantially complete metal-to-metal bond between the body and the cylinder bore.

6. The cylinder liner as defined in claim 1 wherein the scuff resistance improving means comprises a plurality of pores distributed throughout the piston-directing surface, the pores having a size sufficient to hold an amount of lubricant to form a substantially continuous, smooth glide path between the piston/piston ring and the inner, piston-directing surface.

7. The cylinder liner as defined in claim 1 wherein the outer, cylinder bore-contacting surface is tapered at an area below the combustion containing area.

8. The cylinder liner as defined in claim 7 wherein a portion of the upper, combustion containing area is copper-infiltrated.

9. The cylinder liner as defined in claim 1 wherein the body is copper-infiltrated.

10. The cylinder liner as defined in claim 9 wherein the body has an upper end, and wherein the copper-infiltration substantially begins at approximately the upper end and substantially ends between about ¼" and about 1" downward from the upper end.

11. The cylinder liner as defined in claim 1 wherein the powdered metal material consists essentially of between about 0.8% and about 1.3% by weight carbon; between about 0.1% and about 0.6% by weight phosphorous; between about 0% and about 5% by weight solid lubricant selected from the group consisting of manganese sulfide, graphite, molybdenum disulfide, selenium, bismuth, tellurium, and mixtures thereof; and the balance being iron.

12. The cylinder liner as defined in claim 1 wherein the powdered metal material consists essentially of between about 0.8% and about 1.3% by weight carbon; between about 1% and about 4% by weight copper; between about 0% and about 5% by weight solid lubricant selected from the group consisting of manganese sulfide, graphite, molybdenum disulfide, selenium, bismuth, tellurium, and mixtures thereof; and the balance being iron.

13. The cylinder liner as defined in claim 1 wherein the powdered metal material consists essentially of between about 0.8% and about 1.3% by weight carbon; between about 0% and about 4% by weight copper; between about 0% and about 5% by weight solid lubricant selected from the group consisting of manganese sulfide, graphite, molybdenum disulfide, selenium, bismuth, tellurium, and mixtures thereof; the balance by weight iron having an average particle size of substantially 100 mesh with an oxide content less than about 0.3% by weight; and between about 5% and about 50% by weight powdered tool steel alloy selected from those commercially available powders designated by the American Steel and Iron Institute as M2, M3 and T15.

14. The cylinder liner as defined in claim 1 wherein the powdered metal material consists essentially of between about 0.8% and about 1.3% by weight carbon; between about 0.1% and about 0.6% by weight phosphorous; between about 1% and about 4% by weight copper; between about 0% and about 5% by weight solid lubricant selected from the group consisting of manganese sulfide, graphite, molybdenum disulfide, selenium, bismuth, tellurium, and mixtures thereof; and the balance being iron.

15. The cylinder liner as defined in claim 9 wherein the powdered metal material consists essentially of between about 0.8% and about 1.3% by weight carbon; between about 0.1% and about 0.6% by weight phosphorous; between about 0% and about 5% by weight solid lubricant selected from the group consisting of manganese sulfide, graphite, molybdenum disulfide, selenium, bismuth, tellurium, and mixtures thereof; and the balance being iron, and wherein the body is between about 0% and about 100% copper-infiltrated.

16. The cylinder liner as defined in claim 6, further comprising means, disposed within the liner, for venting trapped gases formed during die casting.

17. The cylinder liner as defined in claim 16 wherein the venting means comprises the plurality of pores.

18. A cylinder liner for use in an internal combustion engine having a cylinder block with a cylinder bore adapted to carry a piston therein, the liner comprising:

a body formed from a powdered metal material, the body formed therefrom being rigid and wear resistant, the body comprising:
- a smooth, inner, piston-directing surface;
- an outer, cylinder bore-contacting surface; and
- an upper, combustion containing area;

means for improving transfer of heat from the combustion containing area to the cylinder block, wherein the heat transfer improving means comprises an isostatically formed, rough surface finish extending about the outer, cylinder bore-contacting surface, the surface finish having micropores dispersed therein, wherein the rough surface finish and micropores promote a substantially complete metal-to-metal bond between the body and the cylinder bore, and wherein the rough surface finish further promotes a mechanical, interlocking bond between the body and the cylinder bore; and means, disposed within the piston-directing surface, for improving piston ring and piston scuff resistance while maintaining piston-directing surface smoothness, wherein the scuff resistance improving means comprises a plurality of pores distributed throughout the piston-directing surface, the pores having a size sufficient to hold an amount of lubricant to form a substantially continuous, smooth glide path between the piston/piston ring and the inner, piston-directing surface.

19. The cylinder liner as defined in claim 18 wherein the heat transfer improving means further comprises a plurality of regularly spaced raised projections extending around the outer surface in an area substantially corresponding to the combustion containing area, wherein the projections provide an interlocking bond between the body and the cylinder bore, and promote a substantially complete metal-to-metal bond between the body and the cylinder bore.

20. The cylinder liner as defined in claim 19 wherein the powdered metal material is compacted in a high speed, cold isostatic press.

21. The cylinder liner as defined in claim 18 wherein the outer, cylinder bore-contacting surface is tapered at an area below the combustion containing area.

22. The cylinder liner as defined in claim 21 wherein a portion of the upper, combustion containing area is copper-infiltrated.

23. The cylinder liner as defined in claim 22 wherein the body has an upper end, and wherein the copper-infiltration substantially begins at approximately the upper end and substantially ends between about ¼" and about 1" downward from the upper end.

24. The cylinder liner as defined in claim 18 wherein the powdered metal material consists essentially of between about 0.8% and about 1.3% by weight carbon; between about 1% and about 4% by weight copper; between about 0% and about 5% by weight solid lubricant selected from the group consisting of manganese sulfide, graphite, molybdenum disulfide, selenium, bismuth, tellurium, and mixtures thereof; and the balance being iron.

25. The cylinder liner as defined in claim 18 wherein the powdered metal material consists essentially of between about 0.8% and about 1.3% by weight carbon; between about 0% and about 4% by weight copper; between about 0% and about 5% by weight solid lubricant selected from the group consisting of manganese sulfide, graphite, molybdenum disulfide, selenium, bismuth, tellurium, and mixtures thereof; the balance by weight iron having an average particle size of substantially 100 mesh with an oxide content less than about 0.3% by weight; and between about 5% and about 50% by weight powdered tool steel alloy selected from those commercially available powders designated by the American Steel and Iron Institute as M2, M3 and T15.

26. The cylinder liner as defined in claim 18 wherein the powdered metal material consists essentially of between about 0.8% and about 1.3% by weight carbon; between about 0.1% and about 0.6% by weight phosphorous; between about 1% and about 4% by weight copper; between about 0% and about 5% by weight solid lubricant selected from the group consisting of manganese sulfide, graphite, molybdenum disulfide, selenium, bismuth, tellurium, and mixtures thereof; and the balance being iron.

27. The cylinder liner as defined in claim 22 wherein the powdered metal material consists essentially of between about 0.8% and about 1.3% by weight carbon; between about 0.1% and about 0.6% by weight phosphorous; between about 0% and about 5% by weight solid lubricant selected from the group consisting of manganese sulfide, graphite, molybdenum disulfide, selenium, bismuth, tellurium, and mixtures thereof; and the balance being iron, and wherein the body is between about 0% and about 100% copper-infiltrated.

28. The cylinder liner as defined in claim 18, further comprising means, disposed within the liner, for venting trapped gases formed during die casting, wherein the venting means comprises the plurality of pores.

* * * * *